Jan. 11, 1955

C. M. FRYE 2,699,180

RELIEF VALVE WITH SELF-ALIGNING SEAT

Filed July 17, 1952

Inventor
Colin M. Frye
By Reynolds, Beach & Christensen
Attorneys

United States Patent Office 2,699,180
Patented Jan. 11, 1955

2,699,180

RELIEF VALVE WITH SELF-ALIGNING SEAT

Colin M. Frye, Longlevens, England, assignor to Dowty Equipment Limited, Cheltenham, England Application July 17, 1952, Serial No. 299,356

Claims priority, application Great Britain July 19, 1951

2 Claims. (Cl. 137—539.5)

This invention relates to relief valves in which a spring loaded and guided valve element, usually a ball, engages an annular valve seat by being projected partly into the bore of the seat until the valve element is halted by the seat. The extent of the spring loading determines the blow-off pressure of the valve, and, to be ideal, a relief valve should re-seat at a pressure which is only very slightly below the blow-off pressure but, it is well known that owing to friction and to other causes including misalignment of the element and seat when the element is off the seat, the pressure in the pressure port at the instant when the element re-engages the seat is substantially lower than the blow-off pressure. In some applications, for example where there is a constant source of pressure fluid and the relief valve serves simply as a safety valve, the re-seat pressure may not be critical, but in other applications, for example in hydraulically actuated telescopic pit props where the valve is controlling the maximum static pressure in a closed chamber, it is highly desirable that the difference between the blow-off pressure and the re-seat pressure shall be a minimum. A slight delay in the re-seating of the valve may lead to a loss of several tons resistance in the prop.

The present invention seeks to provide an improved construction of relief valve of the kind stated ensuring true concentricity of the valve element and seat thus reducing the difference between the blow-off and re-seat pressures.

When the relief valve is used in a hydraulic pit prop so as to permit the prop to yield under increasing roof loading, the valve may also be employed as a release valve by being associated with an externally operable manual control whereby the pressure chamber of the prop may be released at will to permit dislodgement and withdrawal of the prop. An example is found in the Patent No. 2,621,631 dated December 16, 1952, to George H. Dowty, the application for which was copending with this application.

An embodiment of the invention in a hydraulically actuated telescopic pit prop will now be described with reference to the accompanying drawings, of which:

Figures 1, 2, 3:
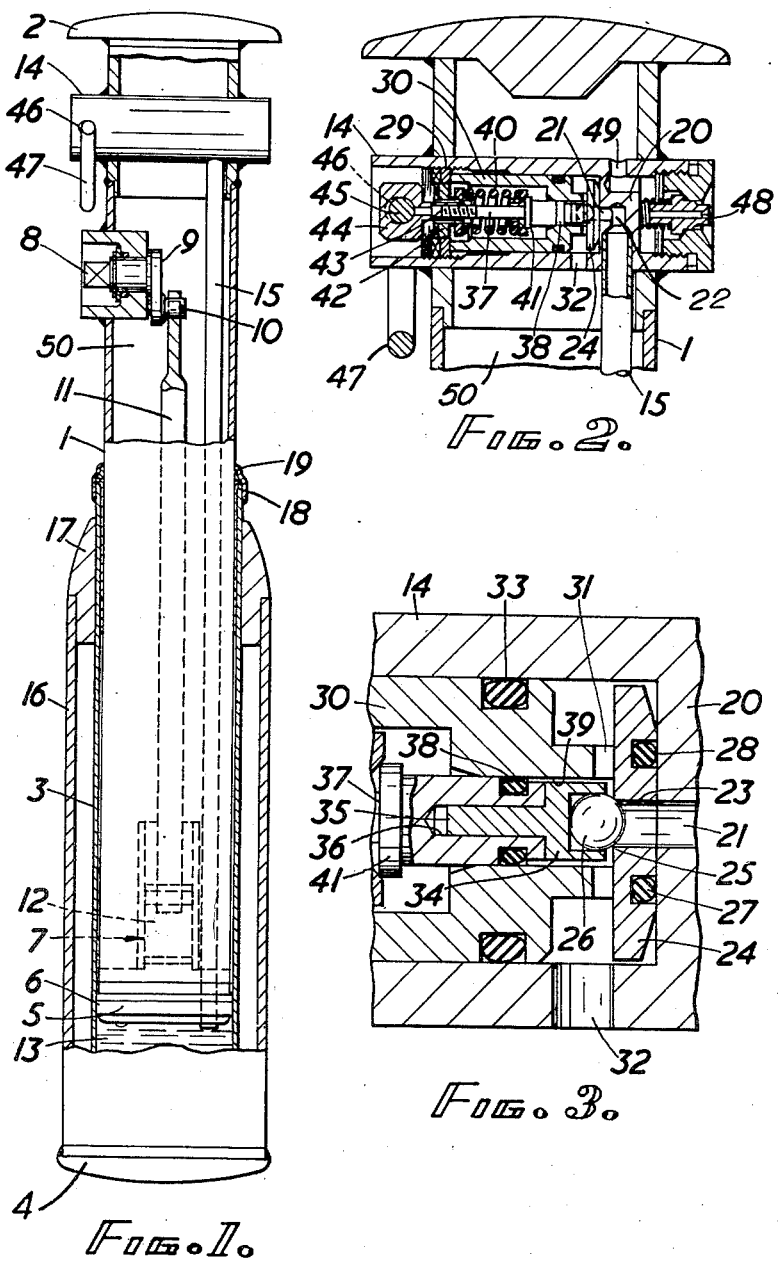
Figure 1 is a side elevation of the prop partly in axial section.
Figure 2 is an axial section of the upper part of the prop drawn to an enlarged scale.
Figure 3 is a fragmentary sectional view of part of Figure 2 drawn to a further enlarged scale.

Apart from the improved relief valve, the prop shown in the drawings is the same as that described in the Dowty patent mentioned above, and comprises a hollow tubular ram 1 which is closed at its upper end by a head piece 2 and is slidable at its lower end telescopically within a cylinder 3 closed by a foot piece 4. The lower end of the ram 1 is closed by a piston 5 which is glanded at 6 to the cylinder 3. A pump, indicated generally at 7, is associated with the piston 5 and is operated externally through a crank shaft 8 on which is a crank 9 having a crank pin 10 engaging the upper end of a connecting rod 11 which extends downwardly through the ram 1 to a piston 12 of the pump 7. The pump 7 is operated by rotary oscillation of the crank shaft 8 and serves to transfer liquid from a reservoir 50 constituted by the hollow in the ram 1 into a chamber 13 situated below the piston 5 in the cylinder 3. The pistons 12 and 5 are suitably valved for this purpose. Extension of the prop is determined by the volume of liquid in the chamber 13 and the prop is relieved of load either automatically when the roof weight exceeds a predetermined weight, or manually when it is desired to dislodge and remove the prop, by the unseating of a relief valve housed within a transverse tubular valve housing 14 at the upper end of the prop. The seating of the valve communicates with the chamber 13 by way of a stack pipe 15 which forms a rigid connection between the valve housing 14 and the piston 5 at the lower end of the ram 1.

The cylinder 3 is protected throughout the greater part of its length by a spaced tubular shield 16 which extends up from the foot piece 4 to a collar 17 of rubber or like material. The piston 5 is slightly larger in diameter than the tube of the ram 1, and there is provided a bearing bush 18 at the upper end of the cylinder 3. Above the bearing bush 18 the cylinder 3 is glanded to the ram 1 by a gland ring 19.

Referring to Figures 2 and 3 which show in detail the construction of the relief valve, the valve housing 14 is formed with a transverse partition 20 having a co-axial passage 21 leading into a radial passage 22 which is in communication with the chamber 13 by way of the stack pipe 15. The passage 21 registers with a bore 23 (see Figure 3) in an annular seat member 24 having an annular seat 25 for engagement by a valve element 26 of spherical form. The member 24 is adapted to seal against the face of the partition 20 by a sealing ring 27 in an end-facing groove 28. The seat member 24 is clamped against the partition 20 by an annular nut 29 and sleeve 30; see Figure 2. The sleeve 30 is castellated at 31 to allow liquid to pass from the bore 23 to an outlet passage 32 in the valve housing 14 and into the reservoir 50 of the prop. The sleeve 30 is sealed at 33 to the housing 14.

The spherical valve element 26 is secured by peening in a cup 34 on the end of a stem 35 which is freely slidable in a bore 36 in a stem 37. The valve element 26 is to all intents and purposes a solid part of the cup 34. The stem 37 is glanded at 38 in a bore 39 in the sleeve 30 and is caused to bear upon the valve element 26 by a spring 40 reacting between a flange 41 on the stem 37 and a nut 42 which is hollow and is screwed into the annular nut 29. The tension in the spring 40 can be adjusted by turning the nut 42. The stem 37 is threaded at 43 to receive an eye bolt 44 through the eye of which extends a closely fitting link pin 45. The link pin 45 extends at opposite ends through elongated holes 46 in the valve housing 14, and between the outer ends of the link pin 45 there extends a U-shaped link 47.

As is explained in the Dowty patent, when the link 47 is pulled in a direction away from the valve element 26 the link pin 45 moves to the outer end of the elongated holes 46 and in so doing withdraws the flange 41 on the stem 37 to relieve the valve element 26 of all spring loading so that the chamber 13 below the ram 1 is relieved manually to effect dislodgment of the prop. A continued pull on the link 47 will cause the prop to topple over about its foot piece 4 and to be dragged endwise towards the operator standing a safe distance away and pulling on the link 47 by means of a cord or cable attached to the latter.

Automatically, on the other hand, when the roof weight has reached a predetermined weight the pressure in the liquid acting on the valve element 26 will overcome the spring action 40 to relieve the pressure at this predetermined roof weight. This automatic pressure relief by the valve element 26 is extremely critical in as much as the valve element 26 should re-engage the seating of the seat member 24 immediately the pressure has been relieved so as to prevent an undue fall in pressure. It is therefore essential that the valve seat 25 of the seat member 24 should be disposed truly co-axially of the axis of movement of the valve element 26 and, with a view to ensuring that this shall be so, the seat member 24 has been formed separately from the partition 20 in the valve housing 14 in accordance with the present invention, so that it may be free to shift laterally in the initial assembly into such precise relation, wherein it is then fixed and remains during the useful life.

The method of assembly ensuring true concentricity between the seat member 24 and the guided valve element 26 will now be described. When the parts are assembled as seen in Figure 2 with the seat member 24 clamped by the nut 29 and with the eye bolt 44, link pin 45 and link 47 removed, the clamping nut 29 is screwed back sufficiently to allow small movement of the seat member 24 away from the face of the partition 20 and laterally relative to the passage 21, and the spring-tensioning nut 42 is screwed back to lessen the tension in the spring 40. The prop is then subjected to an end load sufficient to cause liquid to pass from the chamber 13 through the passage 21 and across the face of the seat member 24 adjacent the partition 20. The seat member 24, which is separate from all other components, is therefore moved by the fluid into engagement with the spherical valve element 26 and with the end of the sleeve 30. The bore 23 in the seat member 24 will thus assume a position of true concentricity with respect to the valve element. While the end load is maintained on the prop the annular clamping nut 29 is turned to clamp the seat member 24 firmly against the face of the partition 20. The end load on the prop can now be removed and the spring 40 can be given its proper setting by correctly positioning the spring-tensioning nut 42 inside the clamping nut 29. The nut 29 is preferably locked in the valve housing 14 by punching, and the nut 42 similarly locked in the nut 29. The eye bolt 44 together with the link pin 45 and link 47 can now be fitted to complete the structure of the prop.

To ensure that the air pressure in the upper part of the ram will not depart substantially from atmospheric pressure, there is provided in the other end of the housing 14 an air valve 48 of rubber or like material having a breather slit which will open when the air pressure exceeds atmospheric pressure, the air passing through passages 49 in the housing 14. The air valve 48 is lightly spring loaded so that it can be depressed from the outside to relieve air pressure at will and to permit air to pass into the upper part of the ram.

The improved arrangement of relief valve in accordance with the invention provides for re-seating of the valve element sufficiently rapidly to prevent an undue loss of pressure in the chamber 13 following an automatic relief of pressure in this chamber. It will be apparent that the invention can also be applied in other applications where rapid re-setting of a relief valve is required.

I claim:

1. A relief valve assembly comprising a tubular valve housing having a transverse partition intermediate its ends defining a high pressure chamber at one end of the housing and a low pressure chamber at its other end, said partition being axially ported for communication between said chambers, an annular seat member within the low pressure chamber resting against said partition, and being of a diameter enough smaller than that of the housing to afford said member limited movement transversely of the axis of the partition while the member's central aperture registers with the partition's port, a valve member in the low pressure chamber, of a shape to enter partially within the seat member's central aperture, and cooperating therewith to seal such aperture, a sleeve coaxially received within and having means sealing its outer wall with relation to the low pressure end of the valve housing, complemental guide means slidably guided within said sleeve and comprising means confining said valve member to precise axial movement relative to the sleeve, spring means operatively engaged with the guide means to urge the valve member to seat upon said seat member, and by such seating to effect precise axial alignment therebetween through so much transverse shifting of the seat member as is a necessary result of their seating interengagement, and adjustable means reacting from the housing upon said sleeve, independently of said spring means which urges the valve member to its seat, to engage said sleeve with said seating member and to clamp the latter, upon completion of its transverse shifting, in fluid-tight engagement against the transverse partition, to fix the seat member for subsequent operation in its valve-aligned position.

2. A relief valve assembly for reseating at a pressure slightly lower than blow-off pressure, comprising a valve housing having a partition defining a high pressure chamber at its one side and a low pressure chamber at its opposite side, said partition having a flat surface at the low pressure side, and having a port terminating in said flat surface for communication between said chambers, an annular seat member within the low pressure chamber having a flat surface resting against the flat surface of the partition, and with its central aperture in registry with the port, and said seat member being enough smaller in diameter than that of the low pressure chamber to afford said member limited movement transversely of the axis of the port, a sleeve having an axial guide bore, said sleeve being received within the low pressure end of the housing in general axial alignment with the port and central aperture and for generally axial movement, and having means sealing its outer wall with relation to the housing, a valve member in the low pressure chamber, of a shape to enter partially within the seat member's central aperture, and cooperating therewith when fully seated to seal such aperture, a valve guide element fixedly mounting the valve member therein and axially slidable within the the sleeve's bore to confine said valve member to precise axial movement relative to the sleeve, spring means yieldable at the blow-off pressure and operatively engaged with the guide element to urge the valve member to seat upon said seat member, and by such seating, while the seat member is free to shift transversely, effecting precise axial alignment between the seat member and the valve member through so much transverse shifting of the seat member as is a necessary result of their seating interengagement, adjustable means reacting from the housing upon said sleeve, independently of the spring means, to engage said sleeve with the seating member and to clamp the latter, upon completion of its transverse shifting, in fluid-tight engagement with the flat surface of the partition, to fix the seat member, during subsequent operation, in its precisely valve-aligned position.

References Cited in the file of this patent

UNITED STATES PATENTS

| Number | Name | Date |
|---|---|---|
| Re. 17,022 | Wilson | July 3, 1928 |
| 424,715 | Knickerbacker | Apr. 1, 1890 |
| 1,734,582 | Jakob | Nov. 5, 1929 |
| 1,811,556 | Nilson | June 23, 1931 |
| 1,999,693 | Hill | Apr. 30, 1935 |
| 2,330,610 | Natter | Sept. 28, 1943 |
| 2,332,629 | Frudden | Oct. 26, 1943 |